UNITED STATES PATENT OFFICE.

G. A. LIEBIG AND E. K. COOPER, OF BALTIMORE, MARYLAND.

IMPROVED PROCESS FOR MANUFACTURING FERTILIZING-PHOSPHATES.

Specification forming part of Letters Patent No. 45,961, dated January 17, 1865.

*To all whom it may concern:*

Be it known that we, G. A. LIEBIG and E. K. COOPER, of the city and county of Baltimore, and State of Maryland, have invented a new and Improved Mode of Producing Fertilizing-Phosphates; and we do hereby declare that the following is a full, clear, and exact description thereof, which will enable others skilled in the art to fully understand and make use of the same.

It is a known fact that phosphoric acid is almost ineffectual as a fertilizer when combined with iron or alumina, for the reason that this combination resists with greater force the decomposing action of the soil than other phosphates, such as phosphate of lime, &c.

A fertilizer acts most beneficially and immediately when it contains the phosphoric acid in a condition in which it is readily soluble in water—as for instance, the biphosphate of lime, which forms the prominent part of the so-called "superphosphate." This article, from the fact that it contains soluble phosphoric acid, has driven all other fertilizers out of the market. It is manufactured in extensive establishments from common phosphate of lime, Mexican guano, bone-ash, apatite, &c., which we are compelled to import from distant localities, and sometimes at great cost. While the manufacture of artificial manure is thus subjected to all the inconvenience of a distant trade, we consider useless and valueless the large deposits of phosphate of iron and alumina which are being found in nearly every state of the Union. It is evident that phosphoric acid extracted from these phosphates and rendered soluble will be as desirable a fertilizer as any superphosphate containing an equivalent quantity of phosphoric acid.

The object of our invention therefore is to render the phosphoric acid in the phosphate of iron or of alumina, or of both the phosphates, occurring in a more or less pure state—such as blue clay, blue ironstone, viviannite, wavellite, the so-called "Testigo" guano, " El Roque " guano, " Navassa " guano, or any other substance in which phosphate of iron or of alumina, or of both, may be found—available for agricultural and other purposes.

The processes by which this object can be accomplished are as follows:

First. Treating—that is, heating, roasting, melting, or boiling—with caustic lime or carbonate or sulphate of lime, or any other substance containing lime as its base. In this way we obtain a phosphate of lime which can be converted into superphosphate of lime by means of sulphuric acid.

Second. Treating—that is, heating, roasting, melting, or boiling—with caustic or carbonate or sulphate of soda or potash, or any other substance containing potash or soda as its base. In this case we obtain phosphate of soda or potash—a salt which contains phosphoric acid in a soluble state, and will undoubtedly prove as efficient a fertilizer as any other yielding an equivalent amount of soluble phosphate.

Third. Treating—that is, heating, melting—with silicic acid or any compound containing this acid. In this way we could obtain free phosphoric acid, known as "metaphosphoric acid," which can subsequently be transformed into the common phosphoric acid or any phosphate.

We propose to mix this soluble phosphate of soda or potash with either low-grade phosphate of lime or sulphate of lime, thus obtaining an article which will contain from ten to fifteen per cent. of soluble and the equivalent amount of insoluble phosphate.

We may also lixiviate the roasted mass with water and offer the solution to the many manufacturers of artificial manures.

Having thus described our invention, what we claim therein as new, and desire to secure by Letters Patent, is—

The process, substantially as described above, for producing a fertilizing-phosphate containing soluble phosphates.

The above specification of our improved mode of producing fertilizing-phosphates signed this 21st day of November, 1864.

G. A. LIEBIG.
E. K. COOPER.

Witnesses:
R. W. L. KASIN,
W. H. HAYWARD.